United States Patent [19]

Wyatt

[11] Patent Number: 4,471,331

[45] Date of Patent: Sep. 11, 1984

[54] MAGNETICALLY SUPPORTED WORK FIXTURE

[75] Inventor: Kenneth L. Wyatt, Oklahoma City, Okla.

[73] Assignee: AT&T Technologies, Inc., New York, N.Y.

[21] Appl. No.: 439,976

[22] Filed: Nov. 8, 1982

[51] Int. Cl.³ ............................................. H01F 7/20
[52] U.S. Cl. ................................... 335/285; 335/306; 308/10
[58] Field of Search ............... 335/285, 286, 295, 306; 308/10

[56] References Cited

U.S. PATENT DOCUMENTS 3,326,610  6/1967  Baermann ............................. 308/10
3,434,084  3/1969  Milligan .............................. 308/10
4,340,260  7/1982  Forster et al. ....................... 308/10

Primary Examiner—George Harris
Attorney, Agent, or Firm—R. P. Miller

[57] ABSTRACT

Two stacks of toroidal magnets (33, 34, 35 and 37, 38, 39) are coaxially mounted and polarized so that the first stack (33, 34, 35) is centered and spacially supported within the second stack (37, 38, 39). The second stack is mounted in a stationary base (26) while the first stack is mounted in a support (17) on which may be mounted clamps (16) for holding a workpiece, such as a printed circuit board. The board may be freely moved in a horizontal plane to position portions thereof relative to a work tool (18, 21). Any detrimental work forces imparted by operation of the work tool are dissipated by a tilting of the work support against the magnetic fields set up by the coaxial stacks of magnets.

13 Claims, 9 Drawing Figures

MAGNETICALLY SUPPORTED WORK FIXTURE

FIELD OF THE INVENTION

This invention relates to a magnetic fixture for rotatably and pivotally supporting an article and, more particularly, to an arrangement of two stacks of coaxially mounted toroidal magnets that interact to support an article for rotation in a horizontal plane and for pivotal movement relative to the horizontal plane while a work operation is performed on the article.

BACKGROUND OF THE INVENTION

In the manufacture and processing of printed circuit boards or other substrates on which electrical components are, or to be, mounted, it is often required that work operations be performed in which components are assembled on the board, or previously assembled components are further processed by testing the components or by permanently securing the previously assembled components to the board. These various work operations result in the application of forces to the board and to the components that may be detrimental. As an example, components are loosely assembled on a board and subsequently staked or riveted. If the board is rigidly held on a support, forces wil be transmitted from the work area to other sections of the board causing damage or dislodgement to other previously assembled components. If the board is constructed of rigid non-metallic material care must be exercised otherwise the work operations will result in chipping or fracturing sections of the board.

Among the numerous types of work holders available are those that are mounted on a sphere constructed of magnetizable material which is supported within a cavity formed in a base. By establishing magnetic flux paths through the base and sphere, the sphere may be rotated in various orientations and then magnetically held in a desired orientation. One such work holder is shown in U.S. Pat. No. 2,993,395 issued July 25, 1961, to D. I. Bohn where a sphere of high permeability material is circumferentially supported on the end of a tube with a portion of the sphere extending into the tube to be further supported by a pedestal-like core. Windings of a coil are positioned about the core, and when energized magnetic flux paths are established through the core, a portion of the sphere, the tube and a metallic bed on which the tube and core are supported. The sphere is thus magnetically locked in position and the tube and core are magnetically held against the bed. A work holder, such as a vise, is mounted on the sphere.

A need still exists for a holding fixture which will permit a workpiece to be rotated 360° in a horizontal plane to position the workpiece in a fabricating, testing or processing station and then permit pivotal movement of the workpiece relative to the horizontal plane while a work operation is being performed. It is desirable that such a fixture utilize permanent magnets rather than electromagnets which may induce spurious a.c. currents that may be detrimental to electronic or semi-conductor devices mounted on the workpiece or in any surrounding test equipment.

SUMMARY OF THE INVENTION

This invention contemplates, among other things, a magnetically supported work holder that may be easily rotated to move workpieces into a work station whereat the work holder is capable of pivoted movement in response to an application of fabricating forces to a workpiece.

More particularly, in one embodiment a work support is constructed with a downwardly projecting truncated cone section with circumferential steps in which are embedded or mounted permanent toroidal magnets. A mount is constructed with a cavity complementary to the projecting cone section and is provided with circular steps in which are embedded or mounted permanent toroidal magnets. When the projecting section of the support is placed in the mount cavity, the magnets in the support and in the mount are laterally aligned while certain of the magnets in the support also are positioned to overlay the magnets in the mount. The polarity of the magnets is selected so that the overlaying magnets act to repel each other and hold the support slightly spaced from the mount.

Further, the magnets are so polarized that magnetic doublets are provided between the magnets in the support and the laterally aligned magnets in the mount. The cumulative effect of the magnetic forces act to center the support in the mount in a position that is spaced from the magnets in the mount. With such an arrangement of magnets, the support may be easily rotated and upon application of forces to the edge of the support, the support is permitted to tilt.

A work holder fixture may be attached to the support to enable the rotation of a workpiece, e.g., printed circuit board, into a work fabricating device, such as a staking punch. Upon operation of the staking punch to secure or rivet a part to the workpiece, forces are imparted tending to tilt the workpiece and the support. In view of the magnetic forces utilized to hold the support in a suspended position, the support may be readily tilted to accommodate the fabricating forces without imparting detrimental forces to the workpiece.

DESCRIPTION OF THE DRAWINGS

Other objects, features and advantages of the invention will be apparent upon consideration of the following detailed description when considered in conjunction with the drawings, wherein.

DETAILED DESCRIPTION

Figure 1:
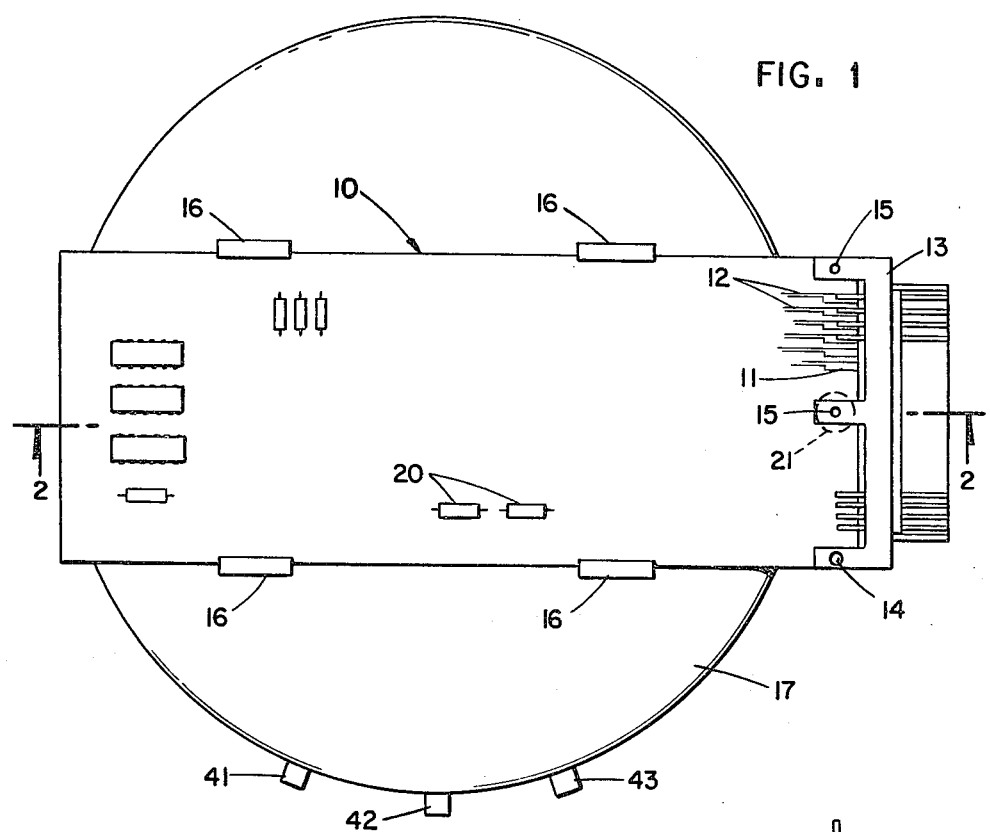
FIG. 1 is a top plan view of a magnetically supported work holder embodying the principles of the invention.
Figure 2:
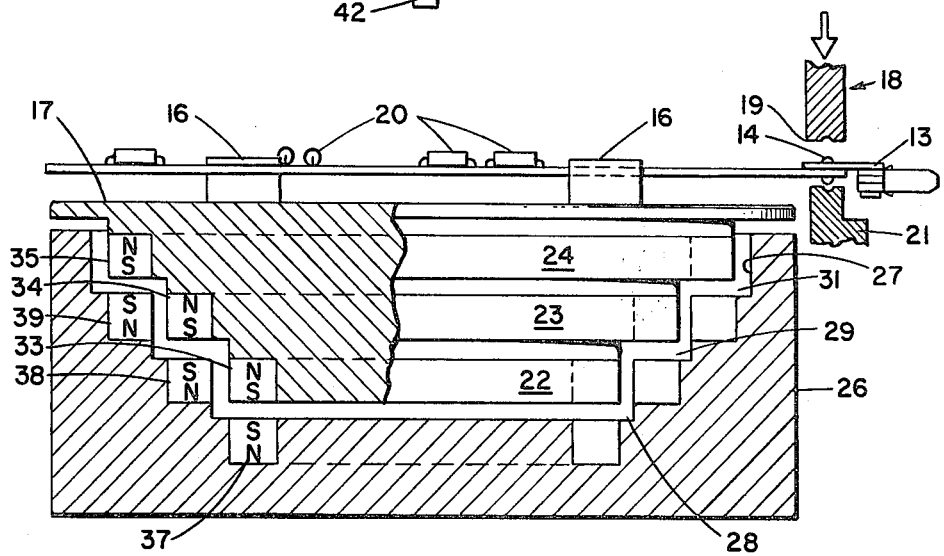
FIG. 2 is a cross-sectional view taken along line 2—2 of FIG. 1 showing a stepped arrangement of two coaxial stacks of toroidal magnets for supporting the work holder for rotative and tilting movement.

For purposes of illustrating a practical application of the invention, there is shown in FIGS. 1 and 2, a printed circuit board 10 having an array of edge contact pads 11 over which are laid terminals 12 extending from a connector body 13. The connector body is to be mechanically secured to the circuit board by rivets 14 which are mounted in axially aligned holes 15 formed in the connector body and the circuit board. The circuit board 10 is secured by clamps or guides 16 to a support 17 which is rotated to present successively the riveting holes to a riveting or staking apparatus 18 comprising a punch 19 and an anvil 21 spaced slightly below the path of movement of the connector 13. The riveting apparatus may be adjusted to move the punch 19 and anvil 21 in and out relative to the support to set each succeeding rivet. Operation of the staking device not only applies forces to the rivet but also resulting forces to the board itself that may chip or fracture the board. Further, such riveting forces may dislodge or otherwise detrimentally affect other components 20 on the board. Inasmuch as the cost of assembled circuit boards may be very high, extreme care must be exercised in performing each succeeding manufacturing operation, such as a staking operation, to avoid damage to the board and the components previously mounted thereon.

The support 17 may be constructed of plastic or other non-magnetizable material and it is assembled, molded, cast or machined to provide a downwardly extending stepped section which is broadly in the outline of a truncated cone. Actually, the construction is such as to provide a number of tiers of circular disc sections 22, 23 and 24. A base 26 constructed of similar non-magnetizable material is fabricated to provide a stepped depression or cavity 27 to receive and accommodate the stepped body portion of the support 17. The formation of the cavity 27 results in the formation of circular steps 28, 29 and 31. The disc sections 22, 23 and 24 of the support 17 have mounted or embedded therein a first series of stacked toroidal permanent magnets 33, 34 and 35, each of which is of succeeding greater diameter. A second series of toroidal magnets 37, 38 and 39 of successively greater diameters are embedded in the mount 26 so that the magnet 37 underlies the magnet 33 and the magnets 38 and 39 are mounted in the steps 28 and 29 to underlie the magnets 34 and 35. The magnet 33 is also laterally aligned with the magnet 38 while the magnet 34 is laterally aligned with the magnet 39.

The polarity for the stacks of toroidal magnets is selected so that the support 17 is centered within the depression 27 formed in the mount, and the magnetic forces are utilized to hold the support 17 in a slightly spaced or elevated relation to the walls of the cavity 27. With such an arrangement of magnetic forces, the support 17 may be easily rotated and tilted against the magnetic forces. The torodial magnets 33, 34 and 35 are polarized with a north magnetic pole on the top surface of each magnet and a south pole on the bottom surface of each magnet. The second stack of magnets 37, 38 and 39 are polarized so that the top surface of each magnet presents a south magnetic pole while the bottom surface presents a north magnetic pole. It will be noted that each south pole of the magnets 33, 34 and 35 overlies a south magnetic pole of the magnets 37, 38 and 39, and as a result, the relatively aligned magnets repel each other to hold the support 17 spaced from the walls of the cavity 27.

Considering toroidal magnets 34 and 39, it will be noted that the south magnetic pole of magnet 34 forms a magnetic doublet with the north magnetic pole of magnet 39. In a like manner, the north magnetic pole of magnet 34 forms a magnetic doublet with the south magnetic pole of magnet 39. These magnetic doublets exist around the entire outer periphery of magnets 33 and 34 attracting the magnets 33 and 34 toward the toroidal magnets 38 and 39. Inasmuch as the forces act around the entire periphery, the net effect is that the support 17 is geometrically centered within the cavity 27. Further, it will be noted that the magnets 37, 38 and 39 of the second stack are centered about a common geometric axis running through both stacks of magnets.

Figure 4:
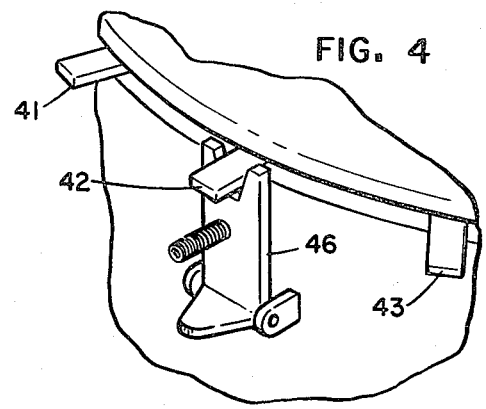
FIG. 4 is an enlarged view of a stop latch device for holding the work holder in selected positions during a work fabricating operation.

The support 17 is provided with a number of radially extending tabs 41, 42 and 43 (see also FIG. 4) which are selectively engaged by a spring-loaded and pivotally mounted latch 46. The tabs 41, 42 and 43 are spaced about the periphery in accordance with the spacing between the holes 15 formed in the connector 13 so that each hole may be latched in position in alignment with the punch 19 and the anvil 21.

In use of this embodiment of the invention, the circuit board 10 is placed in clamps 16 and rotated to present each succeeding rivet hole to the staking apparatus 18, whereat the punch 19 stakes a rivet through the connector 13 against the anvil 21. Inasmuch as the support 17 is magnetically held spaced from the mount 26, the support and the board may tilt, thus alleviating detrimental bending stresses that may be imparted to the board during the staking operation.

Figure 3:
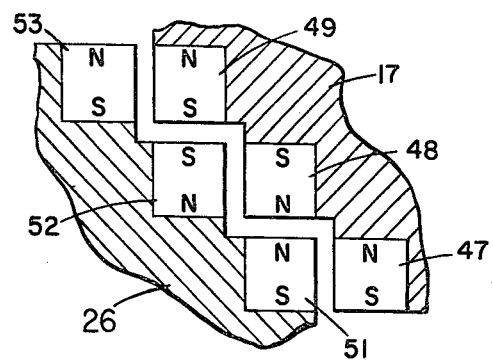
FIG. 3 is an enlarged view of stepped stacks of magnets similar to the stacks of magnets shown in FIG. 1 wherein the polarity of certain of the magnets are reversed to present an alternative embodiment of the invention.

Referring now to FIG. 3 for consideration of an alternative embodiment of the invention, there is again shown two stacks of coaxial toroidal magnets respectively positioned in the support 17 and in the mount 26. The toroidal magnets mounted in the support 17 are designated by the reference numerals 47, 48 and 49, while the magnets embedded in the mount 26 are designated by the reference numerals 51, 52 and 53. The magnets are polarized as shown in FIG. 3 so that the north magnetic pole of magnet 48 in support 17 overlies the north magnetic pole of magnet 51 in mount 26. The south magnetic pole of magnet 49 overlies the south magnetic pole of magnet 52. Inasmuch as like magnetic poles are in overlaying relationship, the support 17 is urged upwardly away from the stationary mount 26.

With this array of magnetic poles, the like poles of magnets 47 and 51 are laterally aligned. Similarly, the like poles in magnets 48 and 49 are laterally aligned with the like poles of magnets 52 and 53. The magnets 51, 52 and 53 thus laterally repel the magnets 47, 48 and 49 to center the support 17 in the cavity 27 formed in the mount 26. The support 17 may be easily rotated to move a workpiece through an adjacent work fabricating station such as the riveting apparatus 18. Again, the operation of the fabricating device to perform a work operation may tilt the workpiece and the support 17 against the magnetic repelling forces.

Figure 5:
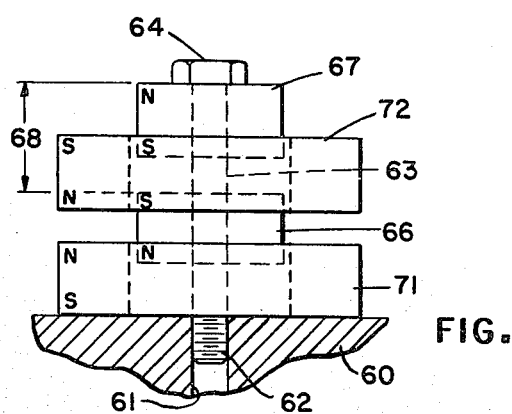
FIG. 5 is a side view of another embodiment of the invention utilizing two stacks of magnets for holding a work holder for pivotal and rotative movement.
Figure 6:
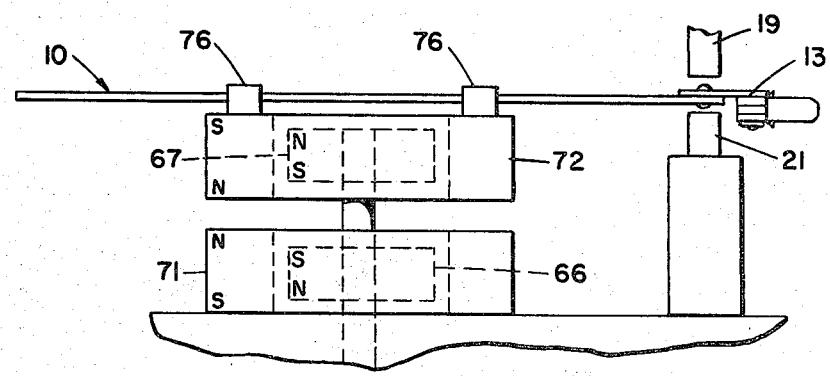
FIG. 6 is another view of the stacked magnets shown in FIG. 5 wherein the topmost magnets is shown supporting a work holder.

Referring now to FIGS. 5 and 6 for a consideration of another embodiment of the apparatus, there is shown a base 60 having a tapped hole 61 into which is screwed a threaded section 62 of a bolt 63 having a head 64. Prior to mounting of the bolt 63, a pair of magnets 66 and 67 having internal threads are screwed onto the threaded shank 62 of the screw 63. The magnets 66 and 67 are spaced apart a predetermined distance 68. A pair of toroidal magnets 71 and 72 are placed coaxially about the hole 61 and then the bolt 63 is screwed into the tapped hole. The polarity of the magnets 66, 67, 71 and 72 are as shown in FIGS. 5 and 6. The upper section of magnet 71 and the lower section of magnet 72 are provided with north magnetic poles so there is a repelling force between these magnets holding the magnet 72 spaced from the magnet 71. The bolt 63 with the stacked toroidal magnets 66 and 67 mounted thereon is screwed into the hole 61 to draw the magnet 66 into the magnet 71 and draw the magnet 67 into the magnet 72 as shown in FIG. 6. The external diameter at the toroidal magnets 66 and 67 is less than the internal diameter of the toridal magnets 71 and 72, so the magnets 66 and 67 can tilt a slight amount before striking the magnets 71 and 72.

The magnet 66 is polarized with a south magnet pole on its top section and a north magnet pole on its bottom section so that magnetic doublets exist between the magnets 66 and 71 acting to center the magnet 71 about the stationarily held magnet 66 and about the common geometric axis running through both stacks of magnets. The magnet 67 is provided with a north magnetic pole in a top section and a south magnetic pole in the bottom section so that again magnetic doublets exit between the magnets 67 and 72 which are effective to center the magnet 72 about the stationarily held magnet 67. The like poles exiting between magnets 71 and 72 act to repel each other and thus hold the magnet 72 in an elevated position with respect to magnet 71. Again a workpiece, such as printed circuit board 10, may be clamped onto a fixture 76 secured to the top section of magnet 72. The workpiece 10 may be rotated relative to the punch 19 and the anvil 21 to move a connector 13 into position for riveting or staking operations. Upon application of the staking forces to the rivets, the board 10 and the magnetically suspended magnets 72 may tilt to dissipate any detrimental effect of these forces.

Figure 7:
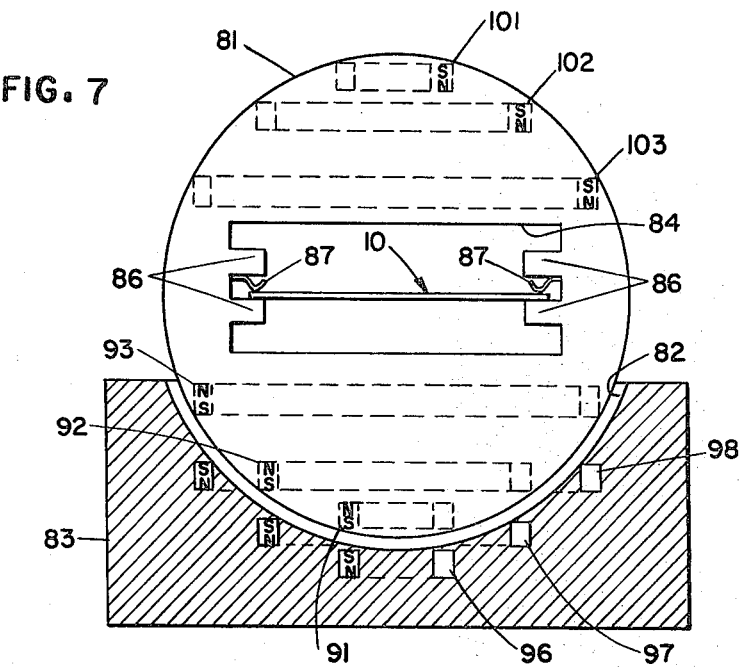
FIG. 7 is an end view of another modified version of the invention wherein a globe-like work holder is magnetically supported.
Figure 8:
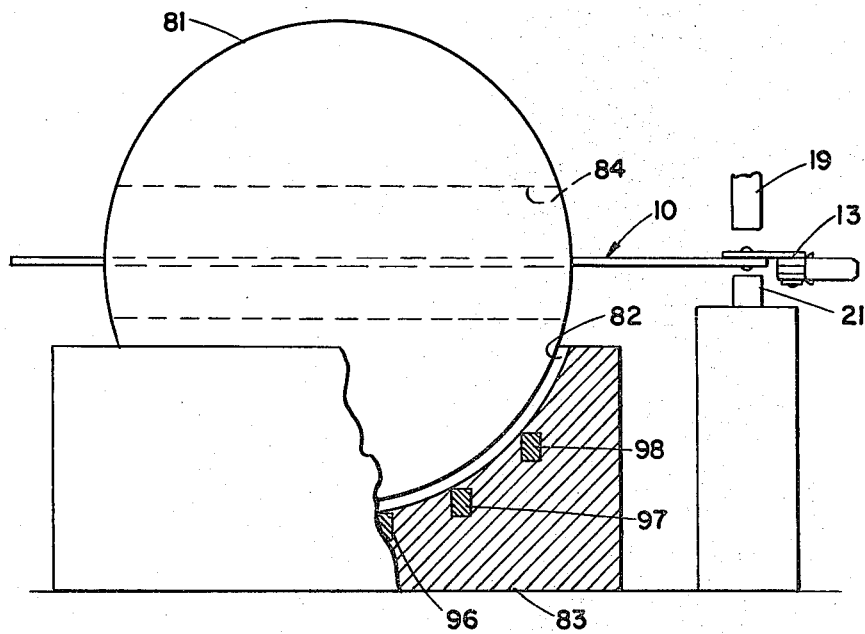
FIG. 8 is another side view of the magnetically supported work holder shown in FIG. 7 together with a showing of a stacking punch.
Figure 9:
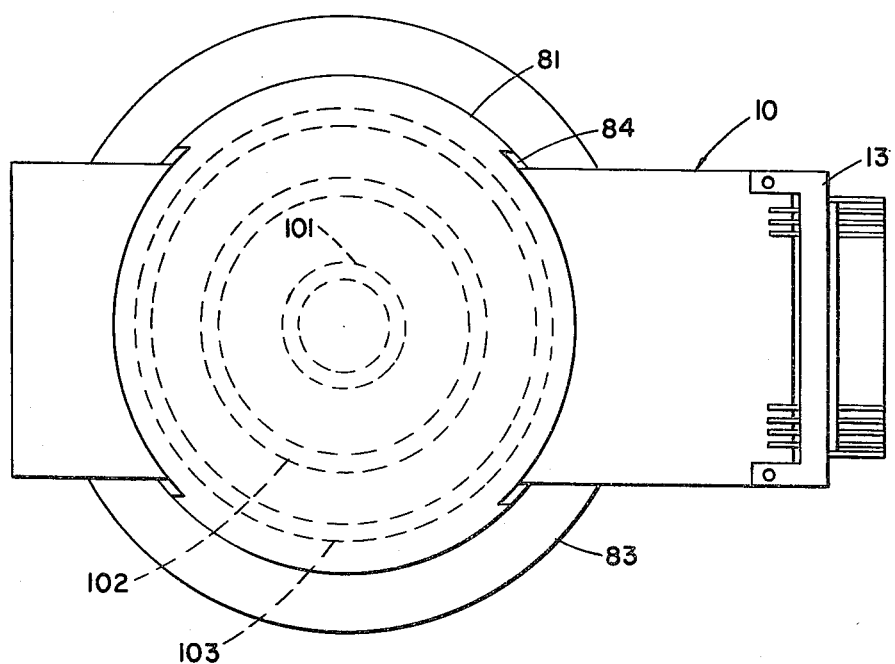
FIG. 9 is a top view of the magnetically supported work holder shown in FIGS. 7 and 8 and particularly illustrating the toroidal construction of the stacks of magnets.

Referring now to FIGS. 7, 8 and 9, there is shown a work holder 81 in the shape of a sphere that is constructed of non-magnetic material and is mounted within a hemispherical-like despression 82 formed in a base mount 83. The sphere is provided with a transverse slot 84 into which projects a number of U-shaped holders 86 each having a spring clip 87 for holding a circuit board 10 against bottom legs of the U-shaped holders. As shown in FIG. 8, the board 10 projects from the sphere 81 to again position an edge connector 13 in alignment with a staking punch 19 and an anvil 21. Embedded in the lower section of the sphere 81 is a stack of toroidal magnets 91, 92 and 93 of progressively increasing diameter. Embedded within the mount 83 is a second stack of toroidal magnets 96, 97 and 98 of progressively increasing diameter. The two stacks of magnets are arrayed so that the magnets 91, 92 and 93 are polarized to present south magnet poles at their lower surfaces, while the magnets 96, 97 and 98 are polarized so that the upper surfaces present south magnet poles and the lower surfaces present north magnet poles. It will be noted from an inspection of the drawing that the south magnet poles of the respective stacks of magnets are aligned and, hence, a repelling force exists between each magnet 96, 97 and 98 and the corresponding magnet 91, 92 and 93 mounted in the sphere. The sphere 81 is thus magnetically suspended in the depression 82.

In use, a printed circuit board 10 is mounted in the work holders 86 so that the board may be rotated to present the edge connector 13 to the punch 19. The magnet suspension allows the board 10 and the sphere 81 to tilt upon the punch 19 striking a rivet in the connector 13. As the sphere tilts or rotates about its center, the south magnet poles on magnets 91, 92 and 93 move toward the south magnet poles on the adjacent magnets 96, 97 and 98 thus encountering repelling magnetic forces which tend to move the sphere back into its originall position.

The sphere 81 may also be provided with a second set of toroidal magnets 101, 102 and 103, positioned in and stepped along about a common geometric axis running through both stacks of magnets mounted in the sphere. The sphere may be rotated 180° to move the magnets 101, 102 and 103 into the depression 82 to align these magnets with the magnets 96, 97 and 98. The rotation of the sphere through a 180° turns the bottom side of the circuit board 10 into an up position to allow other work operations to be performed on the sections of the board that project beyond the sphere 81.

In summary, it may be realized that in each instance, two stacks of coaxial toroidal magnets are utilized to support a work holder for rotative movement about a vertical axis and for pivoting or tilting movement with respect to a horizontal plane. The function of the magnetic work holder is decribed with respect to a rivet staking operation but is to be understood that many other fabricating and testing operations may be performed on a workpiece utilizing the benefits of the described magnetic work holders.

What is claimed is:

1. A fixture for movably supporting an article, which comprises:
    a first stack of toroidal magnets;
    a second stack of toroidal magnets coaxially positonable with respect to the first stack of magnets;
    means for coaxially mounting said first and second stacks of magnets in arrangements of at least three magnets, each arrangement of magnets comprises a pair of vertically aligned magnets with at least one magnet of said pair of magnets laterally aligned with a third magnet in the other stack, each of said arrangements of magnets being polarized in a manner such that said laterally aligned magnets coaxially center said second stack of magnets with respect to said first stack and said vertically aligned magnets magnetically support the second stack in spaced relation to said first stack; and
    means secured to said second stack for supporting an article.

2. A fixture as defined in claim 1 wherein said first and second stacks of magnets are polarized to laterally apply magnetic repelling forces to the magnets in the second stack.

3. A fixture as defined in claim 1 wherein said first and second stacks of magnets are polarized to laterally apply magnetic attracting forces to the magnets in the second stack.

4. A fixture as defined in claim 1 wherein said first stack of magnets are of progressively greater diameters from the bottom of the stack and said second stack of magnets are of progressively greater diameters than the diameters of said first stack and positioned so that each magnet of said second stack overlies a magnet of said first stack.

5. A fixture as defined in claim 1 wherein said mounting means includes:
 a support having a truncated stepped shape to form a plurality of circular stepped sections into which the second magnets are located, each of said second magnets having a diameter corresponding to the stepped section in which the magnet is located;
 a base mount having a cavity complementary to the stepped sections of said support to provide stepped sections in which said first magnets are located; and
 said article supporting means is mounted on said support.

6. A fixture as defined in claim 1 wherein said first stack of toroidal magnets are of the same external diameter, and said second stack of toroidal magnets have an internal diameter greater than the external diameter of the first magnets; and
 means are provided to locate the first stack with the first magnets positioned within the second magnets.

7. A fixture as defined in claim 1 wherein said mounting means includes:
 a sphere for supporting the first magnets in a first hemispherical section thereof; and
 a mount having a hemispherical cavity for receiving said first hemispherical section and for supporting the second magnets.

8. A fixture as defined in claim 7 wherein said sphere is formed with a transverse diametrical opening for receiving an article to be worked upon.

9. A fixture as defined in claim 7 which includes:
 a third stack of magnets of progressively greater diameter located in the second hemispherical section of said sphere; and
 said third stack being arranged to cooperate with said second stack of magnets when said sphere is rotated 180° to support said sphere in spaced relation to the wall of said cavity.

10. A fixture for movably supporting an article, which comprises:
 a first stack of toroidal magnets each having an increasing inner diameter from the bottom to the top of the stack;
 a second stack of toroidal magnets each having an increasing outer diameter from the bottom to the top of the stack;
 means for mounting said second stack of magnetscoaxially within said first stack of magnets with each of said second magnets overlaying a magnet in said first stack, and with each said second magnets other than the topmost second magnet laterally aligned with a magnet in said first stack;
 each of said first toroidal magnets magnetized with a vertical north to south magnetic axes extending in a first direction and each of said second magnets magnetized with a vertical north to south axes extending in a second direction opposite to said first direction, whereupon each arrangement of a pair of vertically aligned magnets cooperate with a laterally aligned magnet so that said second magnets are urged vertically away from said first magnets and said second magnets are horizontally urged to center within said first magnets; and
 means for supporting an article on said second magnets.

11. A fixture for movably supporting an article:
 a first stack of toroidal magnets having vertical north to south magnetic axes extending in an opposite direction within each succeeding magnet;
 a second stack of toroidal magnets positionable about the first stack of magnets having vertical north to south magnetic axes extending in opposite directions within each succeeding magnet; said magnetic axis of each magnet of said second stack extending in a direction opposite to the direction of the magnetic axis of each magnet of said first stack within which the second magnet is positioned;
 means for mounting said first stack of magnets within said second stack of magnets with said magnets in said second stack laterally aligned with said magnets in said first stack and with said magnets in the second stack in overlaying position so that said second magnets are magnetically repelled and spaced from each other and said first magnets magnetically attract said second magnets into positionscoaxial with respect to a center of said first stock of magnets; and
 means mounted on the top magnet in the second stack for supporting an article.

12. A fixture for holding a workpiece, which comprises:
 a first group of toroidal shaped magnets having a south magnetic pole at the top face of each magnet and a north magnetic pole at the bottom face of each magnet, each magnet having a successively greater diameter;
 first means for supporting the first group of magnets in a stack with the smallest diameter magnet of the bottom and with each succeeding magnet of greater diameter being supported above a magnet of lesser diameter, said supporting means and stack of first toroidal shaped magnets forming a cavity having a stepped wall formed by the inner surfaces of the toroidal magnets and the top surfaces of the toroidal magnets;
 a second group of toroidal magnets having a north magnetic pole at the top face of each magnet and south magnetic pole at the bottom face of each magnet, each having a successively greater diameter with the smallest diameter magnet of second group having a diameter equal to smallest diameter magnet of the first group, and each succeeding magnet having a diameter that is less than the diameter of a corresponding magnet in the first group so that the second group of magnets fit within the first group of magnets;
 second means for supporting the second group of magnets within said stepped cavity with smallest diameter magnet of the second group positioned to overlay the smallest diameter magnet of the first group and each succeeding magnet of the second group positioned within a succeeding magnet of the first group and positioned to overlie a magnet in the first group with south magnetic poles of the second group of magnets overlying the south magnetic poles of the first group of magnets to vertically urge the magnets apart while the magnetic coupling between the south and north magnetic poles of respective groups of magnets attract each other in horizontal directions to center the second group of magnets within the first group of magnets; and
 a work holding means mounted on the second supporting means.

13. A fixture for movably supporting an article, which comprises:

- a first stack of first toroidal magnets, each succeeding first magnet having a north to south magnetic axis extending in an opposite direction with respect to an adjacent first magnet, each magnet of said first stack of magnets having a progressively increasing inner diameter;
- a second stack of second toroidal magnets, each succeeding second magnet having a north to south magnetic axis extending in an opposite direction with respect to an adjacent second magnet, each magnet of said second stack of magnets having a progressively increasing outer diameter so that said second stack of magnets is positionable within said first stack of magnets with each magnet of said second stack laterally aligned with a magnet of said first stack and with all of said second magnets except the lowermost magnet in overlaying position with a magnet in the first stack;
- means for mounting said first stack of magnets in spaced relation to provide a stepped cavity into which is positioned said second stack of magnets, so that the magnetic axes of each pair of laterally aligned magnets extend in the same direction and the magnetic axes of each pair of overlaying magnets extend in the opposite direction whereupon said second stack of magnets is magnetically repelled into a position spaced from said first stack of magnets and said first and second laterally aligned magnets magnetically repel each other to center said second stack of magnets within said first stack of magnets; and
- means secured to said second magnets for supporting an article.

* * * * *